United States Patent
Hasegawa

(10) Patent No.: US 12,360,239 B2
(45) Date of Patent: Jul. 15, 2025

(54) RADAR APPARATUS

(71) Applicant: DENSO CORPORATION, Kariya (JP)

(72) Inventor: Yutaka Hasegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 369 days.

(21) Appl. No.: 17/929,240

(22) Filed: Sep. 1, 2022

(65) Prior Publication Data

US 2022/0413132 A1 Dec. 29, 2022

Related U.S. Application Data

(63) Continuation of application No. PCT/JP2021/006840, filed on Feb. 24, 2021.

(30) Foreign Application Priority Data

Mar. 5, 2020 (JP) .................................. 2020-037668

(51) Int. Cl.
| | |
|---|---|
| *G01S 13/931* | (2020.01) |
| *G01S 7/40* | (2006.01) |
| *G01S 13/42* | (2006.01) |
| *H01Q 1/32* | (2006.01) |

(52) U.S. Cl.
CPC .......... *G01S 13/931* (2013.01); *G01S 7/4021* (2013.01); *G01S 13/42* (2013.01); *H01Q 1/3208* (2013.01)

(58) Field of Classification Search
CPC ...... G01S 13/931; G01S 7/4021; G01S 13/42; H01Q 1/3208; Y02A 90/10
See application file for complete search history.

(56) References Cited

U.S. PATENT DOCUMENTS

| | | | |
|---|---|---|---|
| 9,372,259 B2 * | 6/2016 | Kishigami | ............. G01S 13/26 |
| 2011/0074620 A1 | 3/2011 | Wintermantel | |
| 2011/0074621 A1 * | 3/2011 | Wintermantel | ...... H01Q 1/3233 342/70 |
| 2011/0080313 A1 | 4/2011 | Wintermantel et al. | |
| 2011/0080314 A1 | 4/2011 | Wintermantel | |
| 2015/0369912 A1 * | 12/2015 | Kishigami | ............. G01S 13/34 342/104 |

FOREIGN PATENT DOCUMENTS

WO    WO-2019054504 A1 *   3/2019   ............. G01S 13/28

* cited by examiner

*Primary Examiner* — Olumide Ajibade Akonai
(74) *Attorney, Agent, or Firm* — Maschoff Brennan

(57) ABSTRACT

A processing unit analyzes a reception signal to calculate, for every plurality of receiving antennas, a velocity spectrum in which a frequency is associated with a velocity at which the phase of the reception signal is changed at every cycle period. The processing unit extracts, as a group of identical object peaks, peaks that are generated on a velocity spectrum due to an identical object and that are identical in number to transmitting antennas. The processing unit determines, for each of the plurality of peaks constituting the group of identical object peaks, whether there is power variation among a plurality of the receiving antennas. The processing unit calculates an orientation of the object except for virtual receiving antennas included in a plurality of virtual receiving antennas and formed by the transmitting antennas corresponding to the peaks determined to involve the power variation.

1 Claim, 13 Drawing Sheets

FOR PHASE NUMBER P = 4

FIG.15
ANGLE MEASUREMENT FOR FIRST TARGET
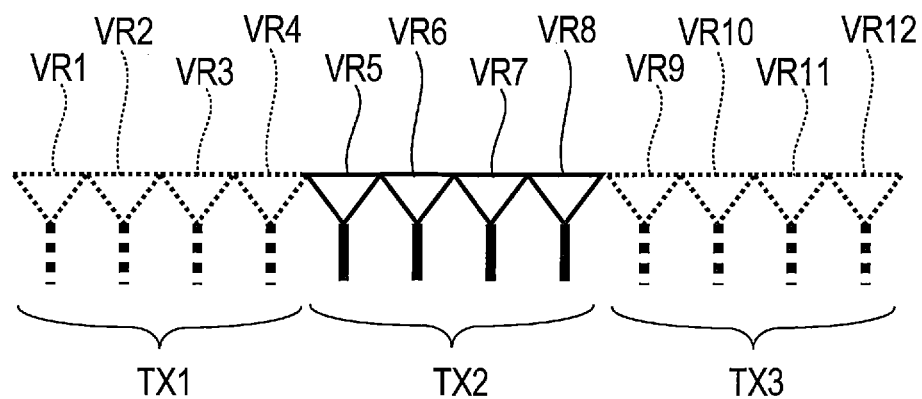
ANGLE MEASUREMENT FOR SECOND TARGET
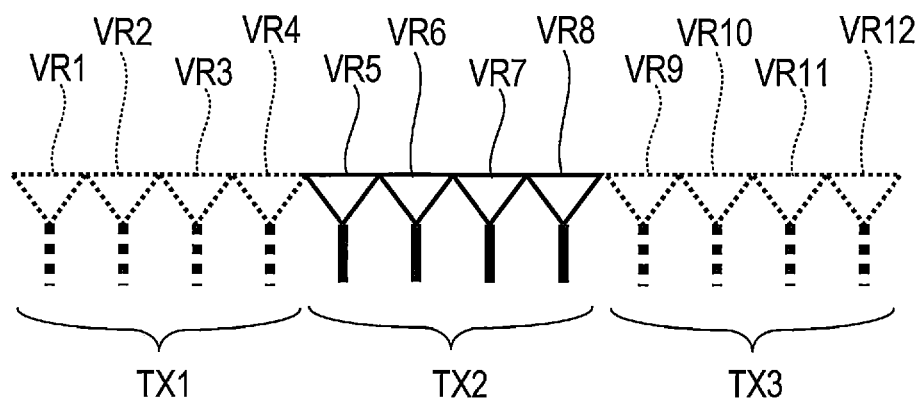

RADAR APPARATUS

CROSS-REFERENCE TO RELATED APPLICATION

The present application is based on and claims the benefit of priority from earlier Japanese Patent Application No. 2020-37668 filed on Mar. 5, 2020, the description of which is incorporated herein by reference.

BACKGROUND

Technical Field

The present disclosure relates to a radar apparatus that transmits and receives radio waves via a plurality of antennas to detect an object.

Related Art

A radar apparatus is disclosed which includes a transmitting antenna unit including a plurality of transmitting antennas arranged in line along a preset array direction and a receiving antenna unit including a plurality of receiving antennas arranged in line along an array direction.

SUMMARY

An aspect of the present disclosure is a radar apparatus including a transmitting antenna unit, an oscillating unit, a modulating unit, a receiving antenna unit, and a processing unit.

The transmitting antenna unit includes a plurality of transmitting antennas. The oscillating unit is configured to generate a common signal of a continuous wave. The modulating unit is configured to perform phase shift keying on a plurality of branch signals into which the common signal is branched and which are identical in number to the plurality of transmitting antennas, the branch signals having phases rotated at every preset cycle period with different phase rotation amounts to generate a plurality of transmission signals that are input to the plurality of transmitting antennas.

The receiving antenna unit includes a plurality of receiving antennas. The processing unit is configured to generate information related to an object having reflected a radiation wave from the transmitting antenna unit, based on a plurality of signal components corresponding to a plurality of transmission signals extracted from each of a plurality of reception signals received at the receiving antenna unit.

The plurality of transmitting antennas and the plurality of receiving antennas are used to form a virtual array including a plurality of virtual receiving antennas.

The processing unit includes a spectrum calculating unit, a velocity determining unit, a power variation determining unit, and an orientation calculating unit.

The spectrum calculating unit is configured to analyze the reception signal to calculate, for every plurality of the receiving antennas, a velocity spectrum in which a frequency is associated with a velocity at which the phase of the reception signal is changed at every cycle period.

The velocity determining unit is configured to extract, as a group of identical object peaks, peaks that are generated on the velocity spectrum due to the identical object and that are identical in number to the transmitting antennas, and configured to determine a relative velocity of the object from a positional relationship, on the velocity spectrum, among a plurality of peaks belonging to the group of identical object peaks.

The power variation determining unit is configured to determine, for each of the plurality of peaks constituting the group of identical object peaks, whether there is power variation among a plurality of the receiving antenna.

The orientation calculating unit is configured to calculate an orientation of the object except for virtual receiving antennas included in a plurality of the virtual receiving antennas and formed by the transmitting antennas corresponding to the peaks determined by the power variation determining unit to involve the power variation.

When a first object and a second object are present around the radar apparatus, and some of a plurality of peaks constituting a group of identical object peaks for the first object overlap some of a plurality of peaks constituting a group of identical object peaks for the second object, the radar apparatus of the present disclosure configured as described above calculates the orientations of the first and second objects except for virtual receiving antennas formed by transmitting antennas corresponding to the overlapping peaks. Thus, when the first object and the second object are present around the radar apparatus of the present disclosure, the radar apparatus can reduce the adverse effects of the second object when calculating the orientation of the first object. Thus, the radar apparatus of the present disclosure can improve the detection accuracy of the orientation of the object.

BRIEF DESCRIPTION OF THE DRAWINGS

In the accompanying drawings:

FIG. 15 is a diagram illustrating an orientation calculating method used when there is power variation.

DETAILED DESCRIPTION OF THE PREFERRED EMBODIMENTS

JP-T-2011-526370 describes a radar apparatus including a transmitting antenna unit including a plurality of transmitting antennas arranged in line along a preset array direction and a receiving antenna unit including a plurality of receiving antennas arranged in line along an array direction.

In the radar apparatus described in JP-T-2011-526370, there is an arrangement interval 4d between two transmitting antennas, and there are arrangement intervals d among four receiving antennas. Thus, in the radar apparatus described in JP-T-2011-526370, a virtual array is formed in which eight virtual receiving antennas are arranged at arrangement intervals d in line along the array direction.

As a result of the detailed studies of the present inventors, the radar apparatus forming the virtual array as described above has been found to have a problem in that when a plurality of objects are present around the radar apparatus, detection accuracy in the orientation of each object is low.

The present disclosure improves the detection accuracy in the orientation of each object.

An embodiment of the present disclosure will be described below with reference to the drawings.

A radar apparatus 1 of the present embodiment is mounted in a vehicle to detect various objects present around a vehicle. The radar apparatus 1 is an MIMO radar including a plurality of antennas that simultaneously transmits and receives radio waves. MIMO is an abbreviation of Multi Input Multi Output.

Figure 1:
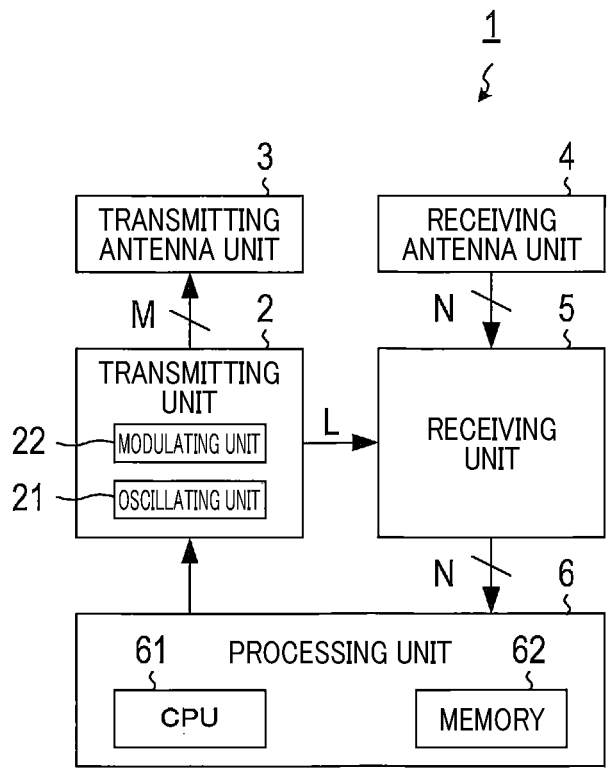
FIG. 1 is a block diagram illustrating a configuration of a radar apparatus.

As illustrated in FIG. 1, the radar apparatus 1 includes a transmitting unit (transmission unit) 2, a transmitting antenna unit (transmission antenna unit) 3, a receiving antenna unit (reception antenna unit) 4, a receiving unit (reception unit) 5, and a processing unit 6.

The transmitting antenna unit 3 includes M transmitting antennas. M is an integer of 2 or larger. The transmitting antennas are arranged in line along a preset array direction. In the present embodiment, the array direction is a width direction of a vehicle.

The receiving antenna unit 4 includes N receiving antennas. N is an integer of 2 or larger. The receiving antennas are arranged in line along the same direction as the array direction of the transmitting antennas.

Figure 2:
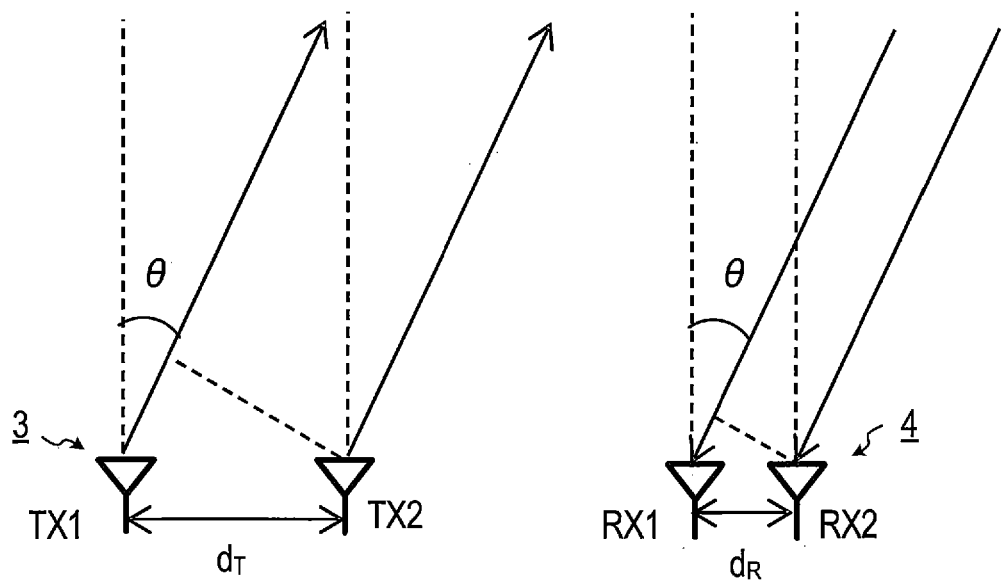
FIG. 2 is a diagram illustrating a relationship between transmitting antennas and receiving antennas, and an object.

Here, signals will be described that are received at the receiving antennas when M=2 and N=2. As illustrated in FIG. 2, an object to be detected is assumed in a direction inclined at an angle θ with respect to a frontal direction of the transmitting antenna unit 3 and the receiving antenna unit 4. The distance between a transmitting antenna TX1 and a transmitting antenna TX2 is assumed to a distance $d_T$, and the distance between a receiving antenna RX1 and a receiving antenna RX2 is assumed to a distance $d_R$. A coefficient of reflection at an object is represented by D, a change in the phase of a signal on a path from the transmitting antenna TX1 to an object is represented by $\alpha_T$, and a change in the phase of a signal on a path from an object to the receiving antenna RX1 is represented by $\alpha_R$. Note that $\alpha_T$ and $\alpha_R$ are expressed by complex numbers.

In this case, a signal transmitted from the transmitting antenna TX1 and received at the receiving antenna RX1 is expressed by Expression (1). A signal transmitted from the transmitting antenna TX1 and received at the receiving antenna RX2 is expressed by Expression (2). A signal transmitted from the transmitting antenna TX2 and received at the receiving antenna RX1 is expressed by Expression (3). A signal transmitted from the transmitting antenna TX2 and received at the receiving antenna RX2 is expressed by Expression (4).

[Formula 1]

$$\alpha_T \cdot D \cdot \alpha_R \tag{1}$$

$$\alpha_T \cdot D \cdot \alpha_R \cdot \exp(jkd_R \sin\theta) \tag{2}$$

$$\alpha_T \cdot D \cdot \alpha_R \exp(jkd_T \sin\theta) \tag{3}$$

$$\alpha_T \cdot D \cdot \alpha_R \exp(jk(d_T + d_R)\sin\theta) \tag{4}$$

Figure 3:
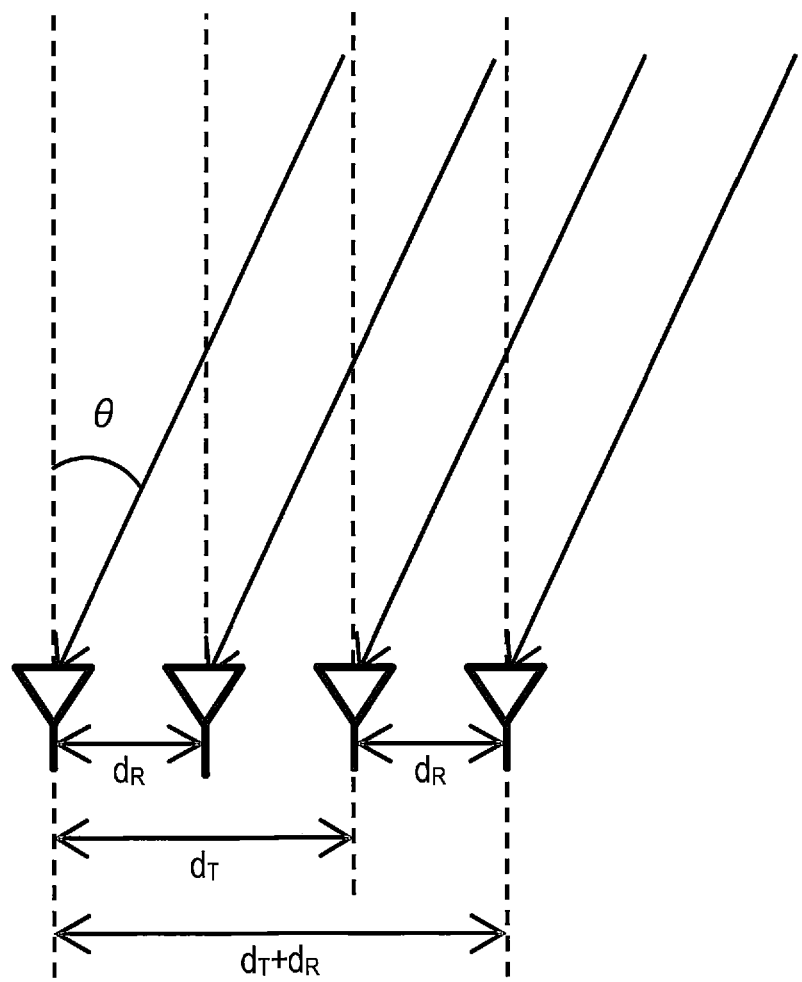
FIG. 3 is a diagram illustrating arrangement of receiving antennas in a virtual array.

These expressions are equivalent to four receiving antennas arranged at positions where distances from one of the receiving antennas that is used as a reference are respectively $d_R$, $d_T$, and $d_T + d_R$, as illustrated in FIG. 3. In FIG. 3, the leftmost receiving antenna is used as the reference. The virtual receiving antennas arranged as described above (hereinafter referred to as the virtual receiving antennas) are referred to as a virtual array.

In the MIMO radar, the use of a virtual array allows an angular resolution equivalent to that obtained when one transmitting antenna and M*N receiving antennas are provided to be achieved by M+N transmitting antennas and receiving antennas.

Figure 4:
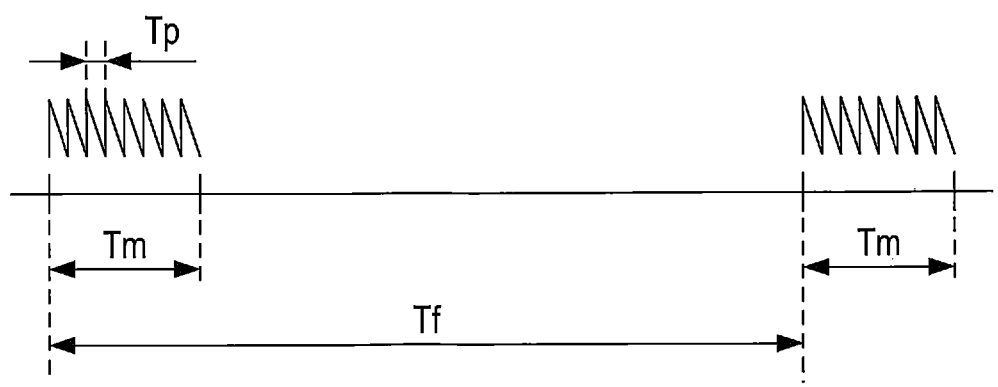
FIG. 4 is a diagram illustrating a cycle period of chirp.

As illustrated in FIG. 1, the transmitting unit 2 includes an oscillating unit (oscillation unit, oscillator unit) 21 and a modulating unit (modulation unit, modulator unit) 22. The oscillating unit 21 generates a common signal of a continuous wave. The oscillating unit 21 supplies the common signal generated to the modulating unit 22, and also supplies the common signal to the receiving unit 5 as a local signal L. As illustrated in FIG. 4, the oscillating unit 21 sets a measurement period Tf (for example, 50 ms) as one frame and repeatedly generates a chirp signal with a continuously changing frequency at a cycle period Tp (for example, 50 μs) during a measurement time period Tm (for example, 10 ms) at the beginning of each frame.

The oscillating unit 21 is configured to appropriately change the measurement period Tf, the measurement time period Tm, and the cycle period Tp in accordance with an indication from the processing unit 6. Note that the frequency bandwidth of the chirp signal changed during the cycle period is constant regardless of the cycle period Tp. In other words, the oscillating unit 21 is configured such that changing the cycle period Tp changes a change rate Δf of the frequency of the chirp signal.

The acceptable range of the cycle period Tp or the acceptable range of the change rate Δf of the frequency of the chirp signal is set such that when a beat signal generated by mixing a transmission signal with a reception signal is analyzed, a frequency shift depending on a relative velocity of an object is negligibly small compared to a frequency shift depending on a distance to the object.

The modulating unit 22 branches the common signal generated by the oscillating unit 21 to generate M branch signals that are identical in number to transmitting antennas belonging to the transmitting antenna unit 3. The modulating unit 22 performs, on each of the M branch signals, phase shift keying for changing the phase of the branch signal at every cycle period Tp. Thus, M transmission signals are generated that are supplied to the respective transmitting antennas. In the phase shift keying, phase rotation amounts Δϕ of different magnitudes are respectively set for the M branch signals, and at every cycle period, the phase of the branch signal is rotated by the phase rotation amount Δϕ.

Figure 5:
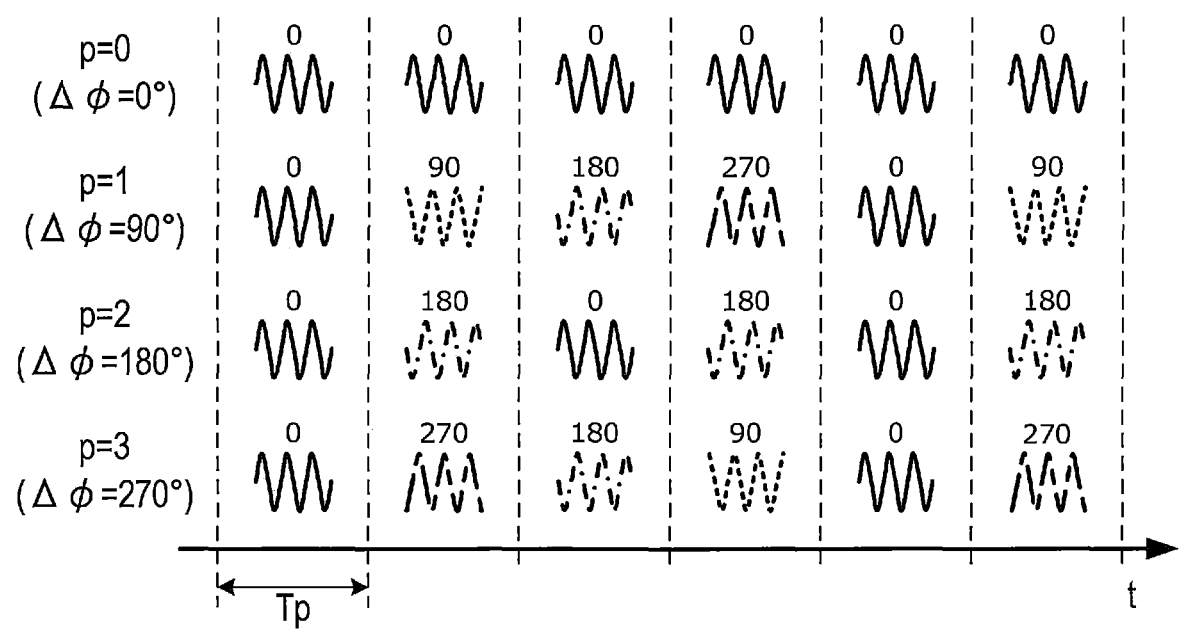
FIG. 5 is a diagram illustrating an example of phase rotation amounts used for phase shift keying in a modulating unit.

Here, the number of phases used in the phase shift keying is denoted by P. P is an integer larger than M. In the modulating unit 22, p=0, 1, 2, ... P−1, and P types of phase rotation amounts expressed by $\Delta\phi=p\times 360°/P$ are used. For example, for P=4, as illustrated in FIG. 5, $\Delta\phi=0°$ for p=0. A phase difference between a branch signal corresponding to an unmodulated signal (that is, a common signal) and a transmission signal corresponding to a modulated signal is 0° at all cycle periods Tp. $\Delta\phi=90°$ for p=1. The phase difference between the common signal and the transmission signal is switched at every cycle period Tp and changes in the order of 0°, 90°, 180°, 270°, 0° (and so on). $\Delta\phi=180°$ for p=2. The phase difference between the common signal and the transmission signal is switched at every cycle period and changes in the order of 0°, 180°, 0°, 180°, 0° (and so on). $\Delta\phi=270°$ for p=3. The phase difference between the common signal and the transmission signal is switched at every cycle period and changes in the order of 0°, 270°, 180°, 90°, 0° (and so on).

As described above, P>M is set, and thus not all of the P types of phase rotation amounts $\Delta\phi$ are used but some of the phase rotation amounts $\Delta\phi$ are used.

The modulating unit 22 is configured to appropriately change the setting of the phase number P, the selection of M types of phase rotation amounts included in the P types of phase rotation amounts $\Delta\phi$ and used for the phase shift keying, and the setting of the correspondence relationship between the selected M types of phase rotation amounts and the M transmitting antennas. The setting may be changed in accordance with an indication from the processing unit 6 or automatically. The automatic change may be effected in accordance with a predetermined pattern or randomly.

As illustrated in FIG. 1, the receiving unit 5 generates a beat signal corresponding to a difference signal between the local signal L and each of N reception signals output from the receiving antennas belonging to the receiving antenna unit 4, samples the beat signal generated, and supplies the resultant signal to the processing unit 6. A configuration for generating each beat signal from the reception signal in association with each receiving antenna (for example, a mixer, an amplifier, and an AD converter provided corresponding to each receiving antenna) is collectively referred to as a receiving channel.

The processing unit 6 is an electronic control apparatus including, as a main component, a well-known microcomputer including a CPU 61 and a memory 62. The memory 62 includes, for example, a ROM, a RAM, and the like. Various functions of the microcomputer are implemented by the CPU 61 executing programs stored in a non-transitory tangible recording medium. In this example, the memory 62 corresponds to the non-transitory tangible recording medium storing the programs. Execution of the programs executes methods corresponding to the programs. Note that some or all of the functions executed by the CPU 61 may be configured as hardware by using one or more ICs or the like. The number of microcomputers constituting the processing unit 6 may be one or more.

A procedure for object detection processing executed by the processing unit 6 will be described. The object detection processing is processing repeatedly executed after being initiated by the processing unit 6.

Figure 6:
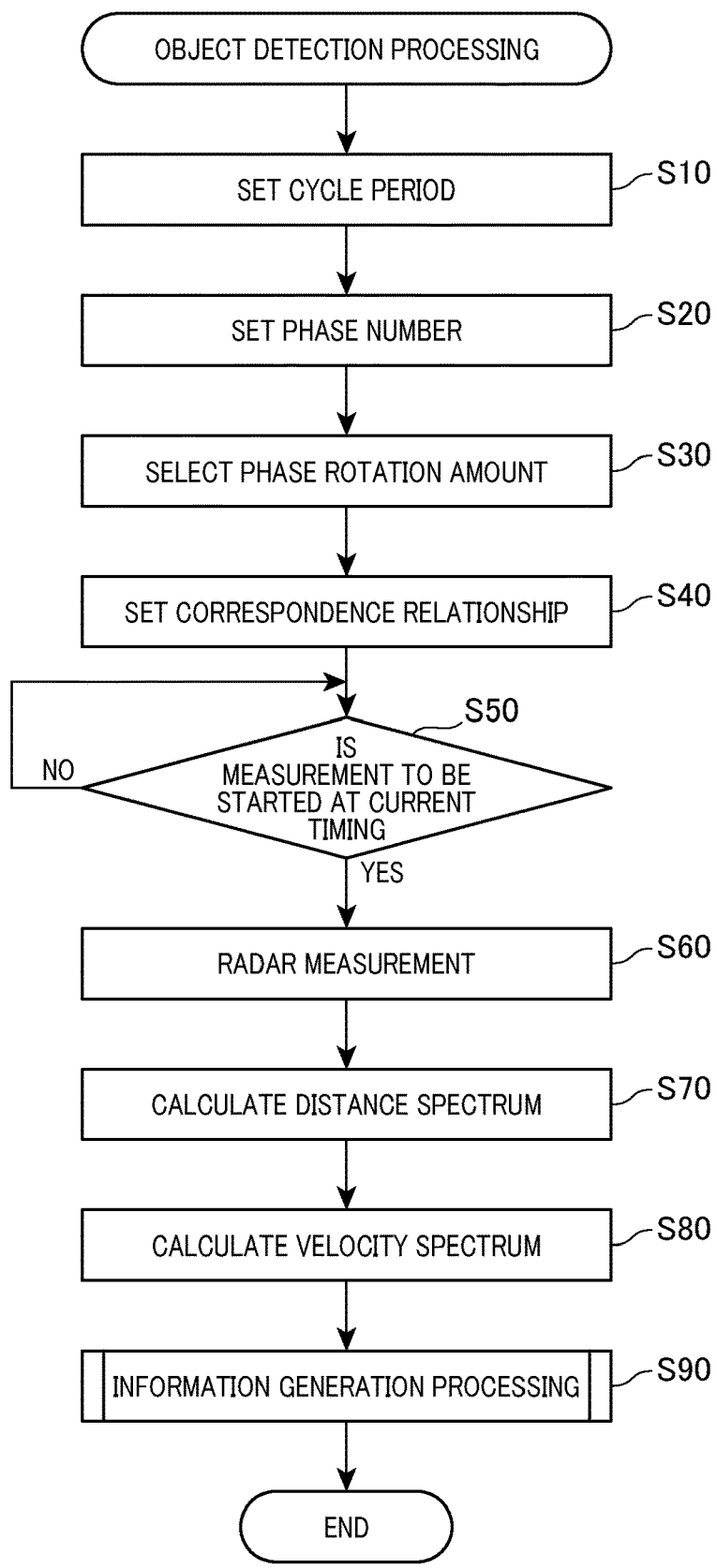
FIG. 6 is a flowchart illustrating object detection processing.

When the object detection processing is executed, first at S10, the processing unit 6 sets the cycle period Tp, corresponding to a parameter related to a common signal that is caused to be generated by the oscillating unit 21, as illustrated in FIG. 6. As described above, changing the cycle period Tp changes the change rate $\Delta f$ of the frequency of the chirp signal. Note that the cycle period Tp may be a fixed value or may be set in accordance with a predetermined pattern or by being randomly selected from among a plurality of types of values, each time the present processing is executed. At S10, the measurement period Tf and the measurement time period Tm may be appropriately variably set.

At S20, the processing unit 6 sets the phase number P, which is used for the phase shift keying in the modulating unit 22. The phase number P is a value larger than at least the number M of transmitting antennas. For example, P=M+1 may be set. The phase number P may be a fixed value or may be set in accordance with a predetermined pattern or by being randomly selected from among a plurality of types of values, each time the present processing is executed.

At S30, the processing unit 6 selects M types of phase rotation amounts from among the P types of phase rotation amounts determined by the phase number P, the M types of phase rotation amounts being used for the phase shift keying in the modulating unit 22. The M types of phase rotation amounts are selected in such a manner as to avoid uniform arrangement of the rotation amounts within 360°, that is, selected to be non-uniformly arranged within 360°.

Specifically, if P and M do not have a common divisor, the phase rotation amount can be optionally selected. If P and M have a common divisor, the phase rotation amounts need to be carefully selected to avoid arrangement intervals corresponding to a repetition of an identical pattern.

Figure 7:
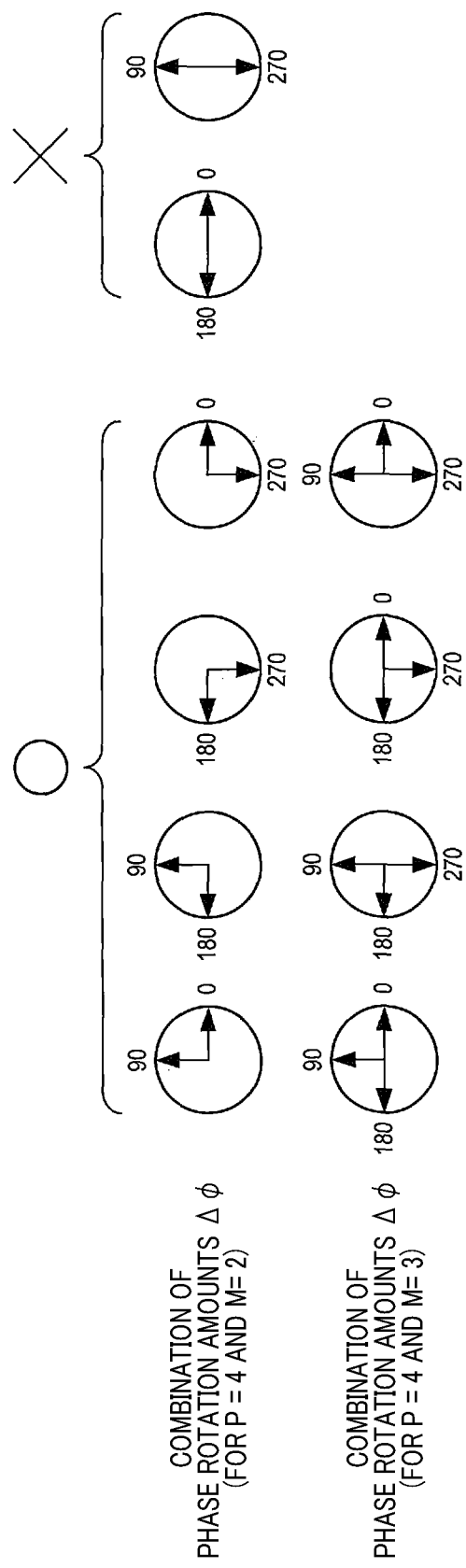
FIG. 7 is a diagram illustrating combination patterns for a selectable phase rotation amount and a non-selectable phase rotation amount.

For example, as illustrated in FIG. 7, for P=4 and M=2, the combination of phase rotation amounts (0°, 90°), (90°, 180°), (180°, 270°), (270°, 0°) are selectable, whereas (0°, 180°) and (90°, 270°) are non-selectable. For P=4 and M=3, all of the combination of phase rotation amounts (0°, 90°, 180°), (90°, 180°, 270°), (180°, 270°, 0°), and (270°, 0°, 90°) are selectable. However, in the present embodiment, a combination including $\Delta\phi=0°$ is inevitably selected.

Note that the selection of phase rotation amounts may be constant or may be switched among selectable combinations in accordance with a predetermined pattern or randomly, each time the present processing is executed.

When the processing of S30 ends, at S40, the processing unit 6 sets the correspondence relationship between the M types of phase rotation amounts selected at S30 and the transmitting antennas as illustrated in FIG. 6. This association may be assigned, for example, in accordance with a preset rule or randomly. The association may be may be constant or may be switched in accordance with a predetermined pattern or randomly each time the present processing is executed.

Figure 8:
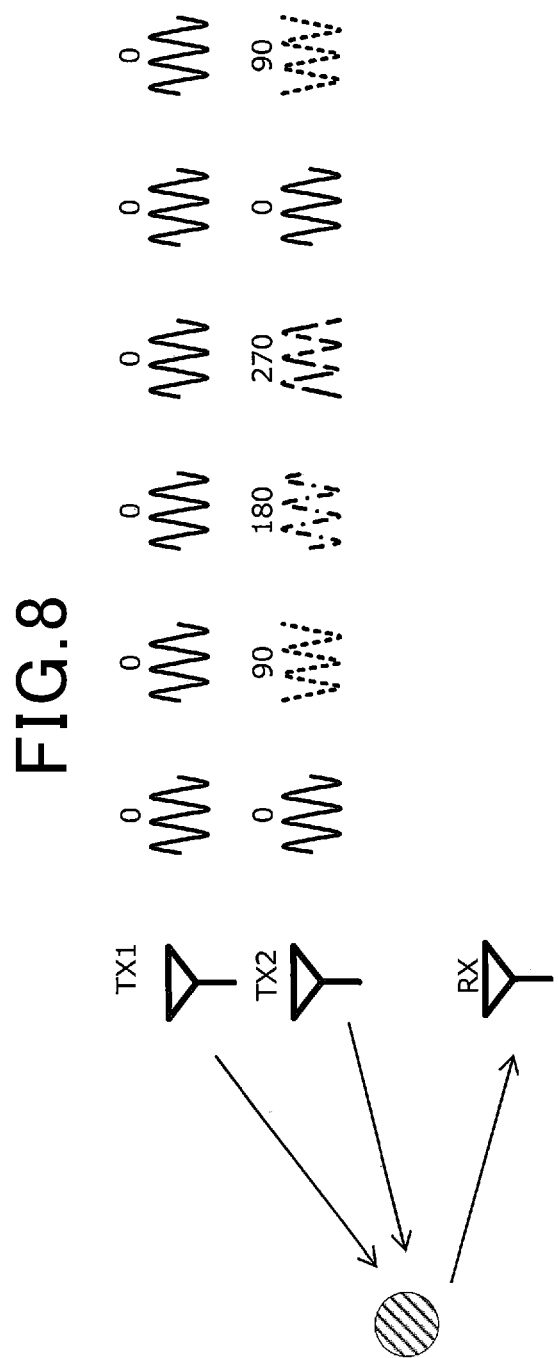
FIG. 8 is a diagram illustrating a selection example of phase rotation amounts.

FIG. 8 illustrates the phases of transmission signals respectively supplied to the transmitting antennas TX1 and TX2 being changed when P=4 and M=2, (0°, 90°) is selected as a combination of phase rotation amounts, and $\Delta\phi=0°$ and $\Delta\phi=90°$ are respectively assigned to the transmitting antennas TX1 and TX2.

When the processing of S40 ends, at S50, the processing unit 6 determines whether to start measurement at the current timing, as illustrated in FIG. 6. If measurement is not to be started at the current timing, the processing unit 6 waits until the measurement start timing by repeating the processing of S50. If measurement is to be started at the current timing, the processing unit 6 proceeds to S60. The measurement start timing is a timing when the frame, having a length determined by the measurement period Tf, is switched.

Upon proceeding to S60, the processing unit 6 activates the transmitting unit 2 to implement radar measurement in accordance with setting results at S10 to S40. Specifically, the processing unit 6 causes the transmitting unit 2 to repeatedly transmit the chirp signal at every cycle period Tp during the measurement time period Tm to acquire sampling results of the beat signal generated from the reception signal for the transmission signal. The number of chirp signals repeatedly transmitted during the measurement time period Tm is K.

At S70, the processing unit 6 executes frequency analysis on the sampling results of the beat signal obtained from N receiving antennas, for each receiving antenna and for each chirp signal to calculate K distance spectra for each of the N receiving antennas. In each distance spectrum, a peak appears at a frequency corresponding to the time required to travel to and from an object (that is, the distance to the object) having reflected radiation waves transmitted from the transmitting antenna. Frequency bins in the distance spectrum are referred to as distance bins.

At S80, the processing unit 6 uses N*K distance spectra calculated at S70 to calculate a velocity spectrum for each receiving antenna. Specifically, the processing unit 6 extracts signals with an identical frequency bin from K distance spectra related to the receiving antenna of interest and executes frequency analysis processing on the extracted signals in a time axis direction. The processing unit 6 executes the processing on all frequency bins (that is, distances).

In the velocity spectrum, when the relative velocity between the radar apparatus and the object having reflected the radiation waves from the transmitting antenna unit 3 is zero, the frequency corresponding to the phase rotation amount assigned to each transmitting antenna is extracted as a Doppler frequency. In other words, a signal component corresponding to $\Delta\phi=0°$ has a frequency of 0 Hz.

Figure 9:
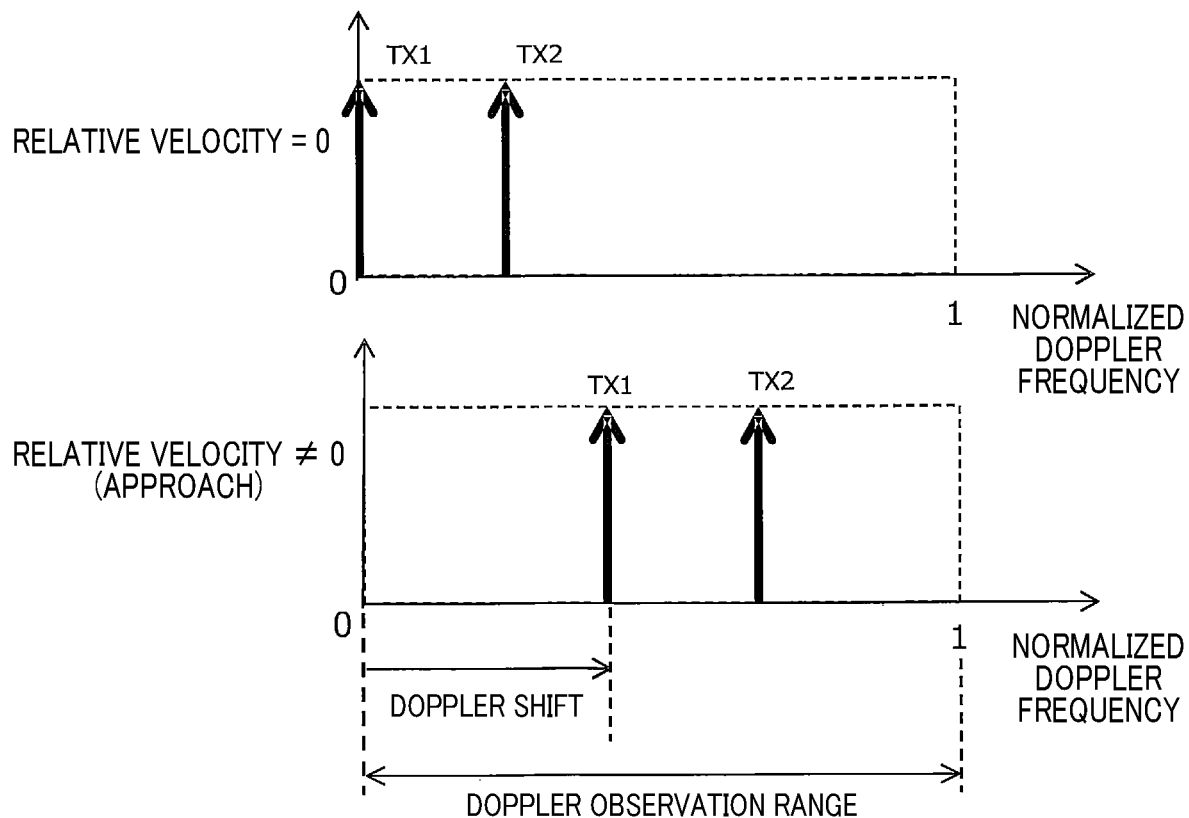
FIG. 9 is a diagram illustrating an example of a group of identical object peaks appearing in a velocity spectrum.

Note that the range within which the Doppler frequency is observed (hereinafter referred to as the Doppler observation range) is determined by the cycle period Tp. As illustrated in FIG. 9, the Doppler frequency is detected at M points of P points into which the Doppler observation range is divided. In FIG. 9, the upper limit of the Doppler observation range is normalized to 1.

In the velocity spectrum, when there is a relative velocity between the radar apparatus and the object, the M Doppler frequencies are shifted by a magnitude corresponding to the relative velocity, and aliasing of the frequency occurs depending on the magnitude of the relative velocity.

Figure 10:
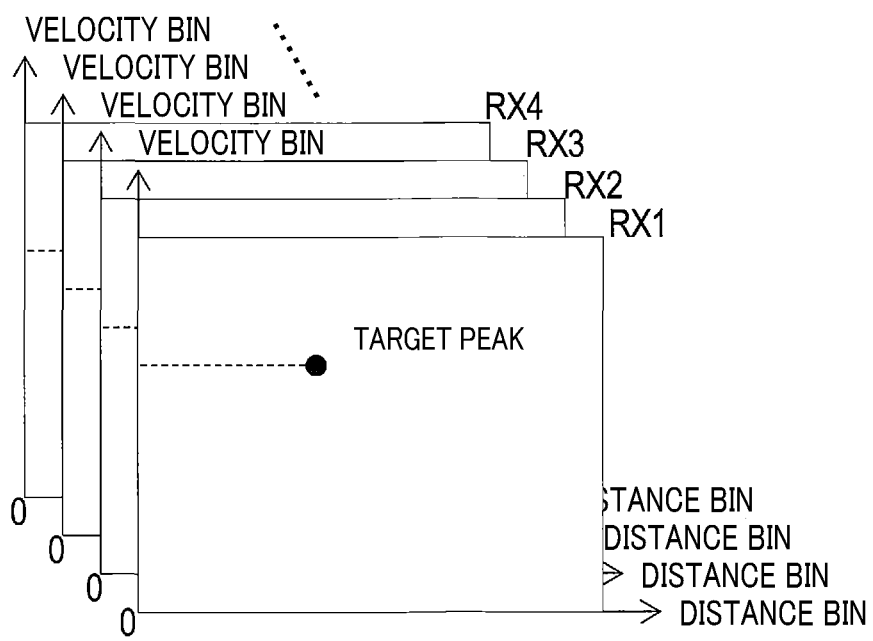
FIG. 10 is a diagram illustrating a reception spectrum.

From calculation results at S70 and S80, a two-dimensional spectrum (hereinafter referred to as a reception spectrum) representing the distance to and the relative velocity relative to the object having reflected the radar wave is generate for each receiving antenna, as illustrated in FIG. 10.

As illustrated in FIG. 6, at S90, the processing unit 6 executes, for each receiving antenna, information generation processing for using the reception spectrum to calculate the distance to and the relative velocity relative to the object having reflected the radar wave and the orientation in which the object is present, and ends the object detection processing.

A procedure for the information generation processing executed at S90 will be described.

Figure 11:
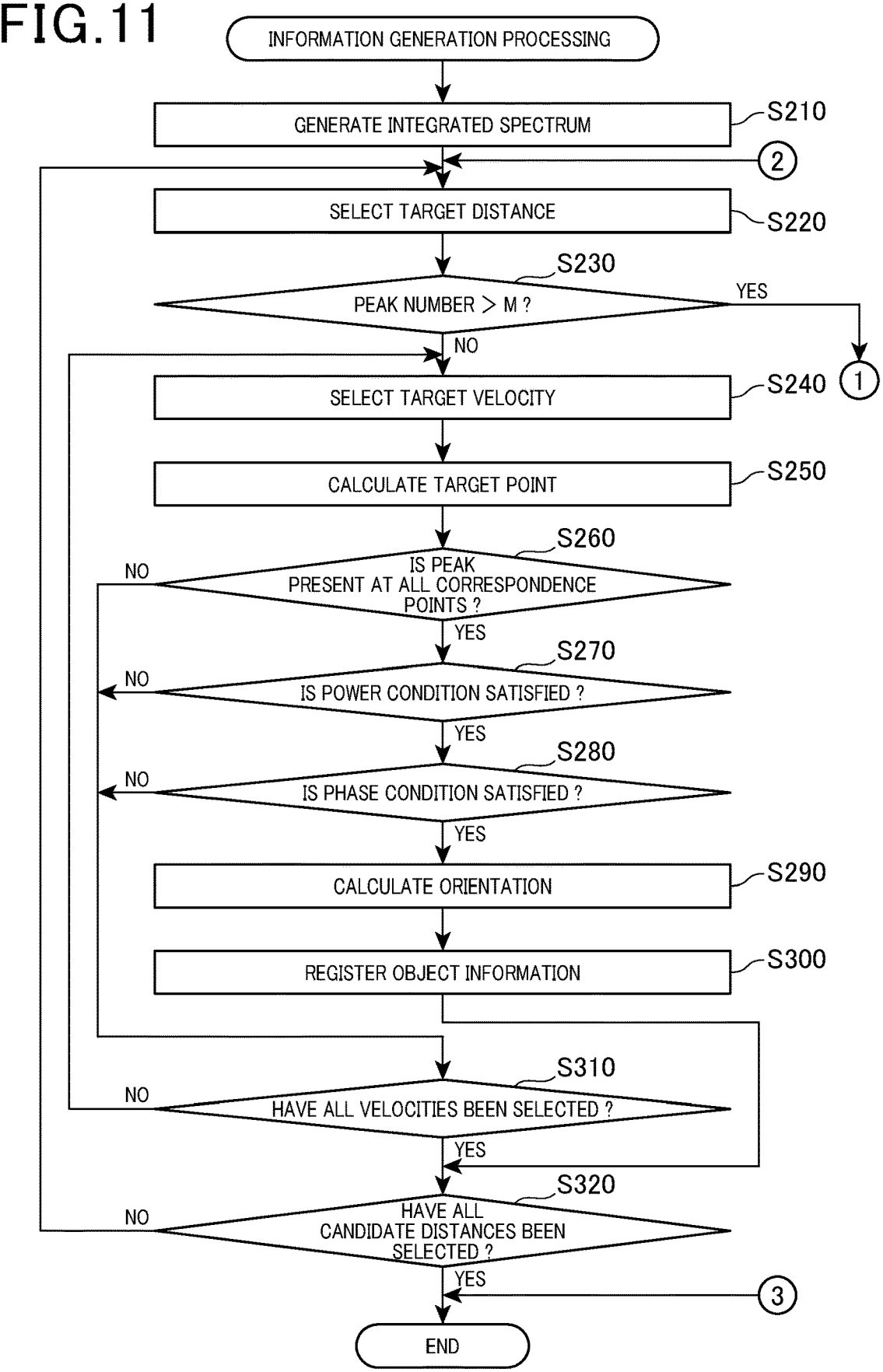
FIG. 11 is a flowchart illustrating a former half of information generation processing.

When the information generation processing is executed, first at S210, the processing unit 6 incoherently integrates N reception spectra generated for each receiving antenna at S80 to calculate one integrated spectrum g(r,v) as illustrated in FIG. 11. The reception spectrum for each receiving antenna is represented by s(r, v, Rch), and the integrated spectrum g(r, v) is calculated using Equation (5). r is a distance, v is a normalized Doppler velocity obtained with the velocity corresponding to the upper limit frequency of the Doppler observation range being assigned the value of 1, and Rch is a number identifying the receiving antenna.

[Formula 2]

$$g(r, v) = \sum_{Rch=1}^{N} |s(r, v, Rch)|^2 \quad (5)$$

At S220, on the integrated spectrum, the processing unit 6 selects, as candidate distances, distances at which M or more peaks with an intensity equal to or greater than a preset threshold have been detected, and selects, from among the candidate distances, a target distance r having yet to be selected as a target for processing from S230 to S300 below.

At S230, the processing unit 6 determines whether the number of a plurality of peaks detected at the target distance r selected at S220 is larger than M. Here, when the number of peaks is equal to or less than M, the processing unit 6 selects, as a target velocity v, a velocity corresponding to the peak that is included in the plurality of peaks detected at the target distance r selected at S220 and that has yet to be selected as a processing target at S250 to S300 below. Here, the processing unit 6 makes selections in order of increasing velocity.

At S250, the processing unit 6 assumes that the peak of the target velocity v corresponds to the phase rotation amount $\Delta\phi=0°$, and in accordance with Equation (6), calculates M−1 correspondence points (r, vj) (j=2 to M) for which peaks corresponding to other phase rotation amounts are estimated to be present. x(j) represents phase rotation amounts other than $\Delta\phi=0°$ selected at S30. v and vj are normalized Doppler frequencies and take a value of 0 to 1. mod(a, m) represents the remainder of division of a by m.

[Formula 3]

$$v_j = v + \text{mod}(x(j)-x(1)/P,1) \quad (6)$$

At S260, the processing unit 6 determines, for all the correspondence points estimated at S250, whether a peak (that is, a secondary local maximum point) is present on the integrated spectrum. If the determination is affirmative, the processing unit 6 proceeds to S270. If the determination is negative, the processing unit 6 proceeds to S310. The M peaks corresponding to the correspondence points are hereinafter referred to as the group of candidate peaks.

Upon proceeding to S270, the processing unit 6 determines whether the group of candidate peaks satisfies a power condition. If the determination is affirmative, the processing unit 6 proceeds to S280. If the determination is negative, the processing unit 6 proceeds to S310. Here, the power condition used is that a difference in the signal intensity of a peak belonging to the group of candidate peaks is within a preset acceptable range. This is based on the knowledge that the peaks based on reflection waves from an identical object should have similar signal intensities.

Upon proceeding to S280, the processing unit 6 determines whether the group of candidate peaks satisfies a phase condition. If the determination is affirmative, the processing unit 6 proceeds to S290. If the determination is negative, the processing unit 6 proceeds to S310. Here, for the phase condition, phase differences between the reference reception channel and other reception channels are calculated, and the condition that the phase difference between candidate peaks is within the preset acceptable range is used as the phase condition. This is based on the knowledge that the peaks based on reflection waves from an identical object should arrive from the same direction and is based on the inter-reception phase differences in peaks arriving from the same direction having similar magnitudes. The group of candidate peaks determined to be affirmative at S280 is referred to as a group of identical object peaks.

Upon proceeding to S290, the processing unit 6 executes an orientation estimation calculation to calculate an orientation θ in which the object is present. Specifically, the processing unit 6 extracts, from each of N reception spectra calculated for each receiving antenna, peaks corresponding to the group of M identical object peaks. The processing unit 6 considers the extracted M*N peaks as reception signals from M*N virtual receiving antennas included in the virtual array, and executes orientation detection processing such as MUSIC or beamforming to calculate the orientation θ of the object. MUSIC is an abbreviation of Multiple signal classification. Note that M peaks extracted, as the group of identical object peaks, from each of the reception signals from the N receiving antennas correspond to M*N reception signals (hereinafter referred to as virtual reception signals) obtained from the virtual array.

At S300, the processing unit 6 registers, as object information, a set of the target distance r, the target velocity v, and the orientation θ calculated at S290, and proceeds to S320.

Upon proceeding to S310, the processing unit 6 determines whether all the peaks (that is, the velocities) detected at the target distance r have been selected as the target velocity v. If the determination is affirmative, the processing unit 6 proceeds to S320. If the determination is negative, the processing unit 6 proceeds to S240.

Upon proceeding to S320, the processing unit 6 determines whether all the candidate distances have been selected as the target distance r. If the determination is affirmative, the processing unit 6 ends the information generation processing. If the determination is negative, the processing unit 6 proceeds to S220.

Figure 12:
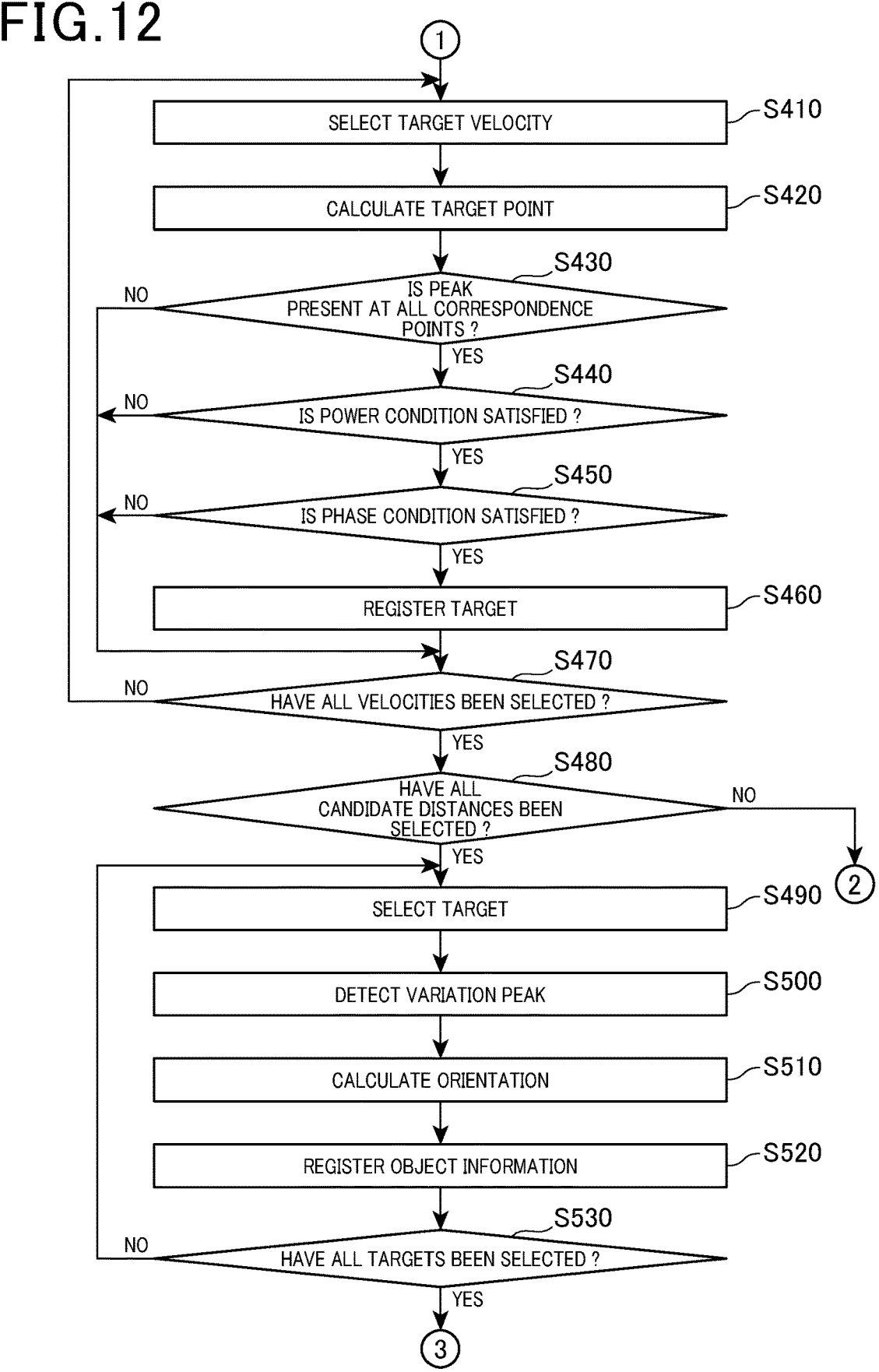
FIG. 12 is a flowchart illustrating a latter half of the information generation processing.

At S230, when the number of peaks is larger than M, at S410, as in the case of S240, the processing unit 6 selects, as the target velocity v, a velocity corresponding to the peak that is included in the plurality of peaks detected at the target distance r selected at S220 and that has yet to be selected as a processing target at S420 to S460 below, as illustrated in FIG. 12.

At S420, as in the case of S250, the processing unit 6 calculates M−1 correspondence points.

At S430, as in the case of S260, the processing unit 6 determines, for all the correspondence points estimated at S420, whether a peak is present on the integrated spectrum. If the determination is affirmative, the processing unit 6 proceeds to S440. If the determination is negative, the processing unit 6 proceeds to S470.

Upon proceeding to S440, as in the case of S270, the processing unit 6 determines whether the group of candidate peaks satisfies the power condition. If the determination is affirmative, the processing unit 6 proceeds to S450. If the determination is negative, the processing unit 6 proceeds to S470.

Upon proceeding to S450, as in the case of S280, the processing unit 6 determines whether the group of candidate peaks satisfies the phase condition. If the determination is affirmative, the processing unit 6 proceeds to S460. If the determination is negative, the processing unit 6 proceeds to S470.

At S460, the processing unit 6 registers, as a target, a set of the target distance r and the target velocity v, and proceeds to S470.

Upon proceeding to S470, as in the case of S310, the processing unit 6 determines whether all the peaks detected at the target distance r have been selected as the target velocity v. If the determination is affirmative, the processing unit 6 proceeds to S480. If the determination is negative, the processing unit 6 proceeds to S410.

Upon proceeding to S480, as in the case of S320, the processing unit 6 determines whether all the candidate distances have been selected as the target distance r. If the determination is affirmative, the processing unit 6 proceeds to S490. If the determination is negative, the processing unit 6 proceeds to S220.

Upon proceeding to S490, the processing unit 6 selects, as a selected target, the target included in the plurality of targets registered in the processing of S460 and that has yet to be selected as the processing target at S500 to S520 below.

At S500, the processing unit 6 detects the peak that is included in the M peaks in the selected target and that involves power variation among the reception channels. Specifically, the processing unit 6 detects whether each of the M peaks involves power variation among the N receiving antennas.

Figure 13:
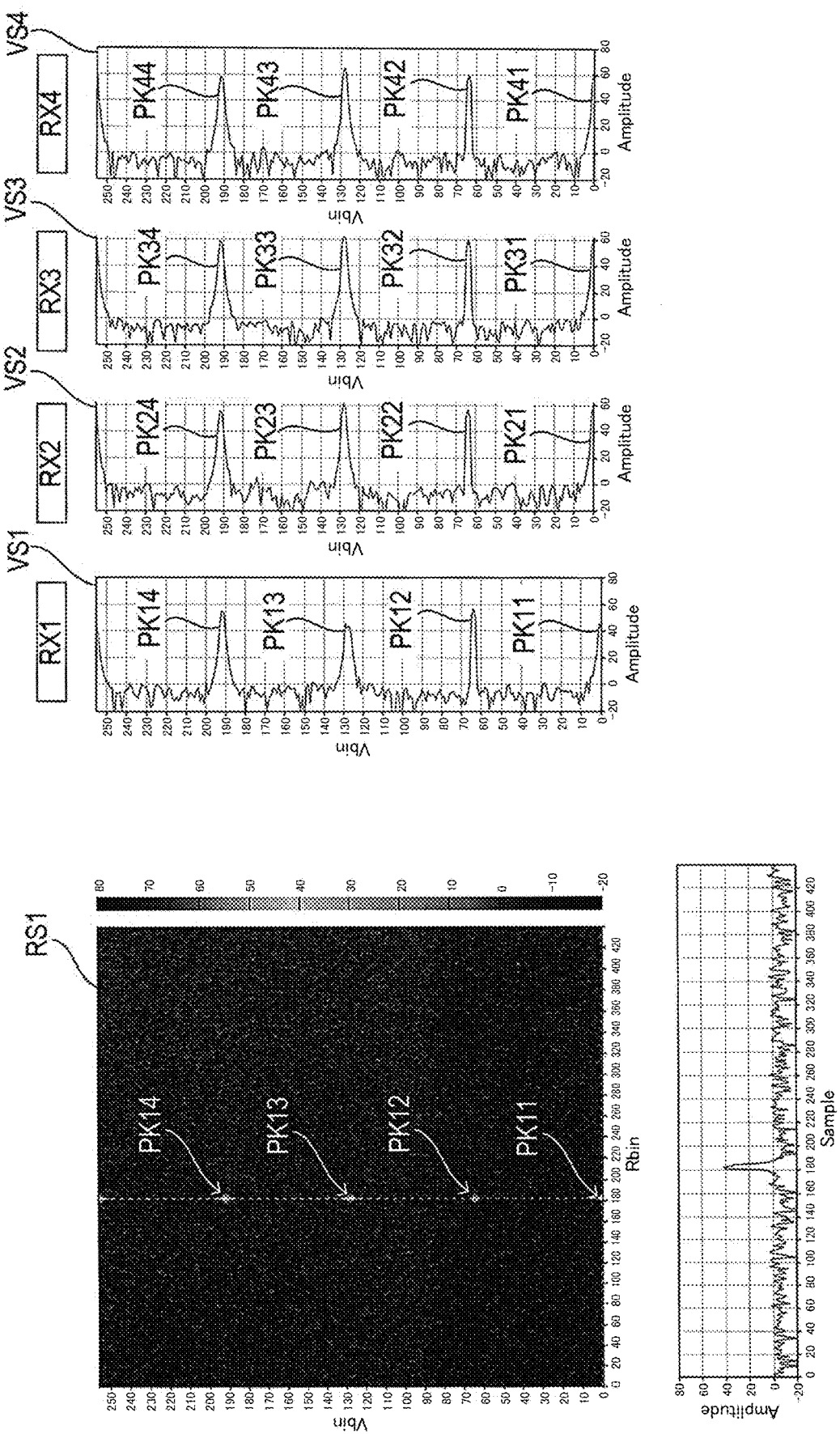
FIG. 13 is a diagram illustrating a reception spectrum and velocity spectra for receiving antennas.

For example, as illustrated in FIG. 13, it is assumed that peaks PK11, PK12, PK13, and PK14 are present in a reception spectrum RS1 from the receiving antenna RX1. The peaks PL11, PK12, PK13, and PK14 are obtained when the distance bin is approximately 180. A velocity spectrum VS1 indicates the correspondence relationship between velocity bins and received power when the distance bin is approximately 180 at the receiving antenna RX1. Similarly, velocity spectra VS2, VS3, and VS4 respectively indicate the correspondence relationship between velocity bins and received power when the distance bin is approximately 180 at the receiving antennas RX2, RX3, and RX4.

Peaks PK11, PK12, PK13, and PK14 are present in a velocity spectrum VS1. Similarly, peaks PK21, PK22, PK23, and PK24 are present in a velocity spectrum VS2. Peaks PK31, PK32, PK33, and PK34 are present in a velocity spectrum VS3. Peaks PK41, PK42, PK43, and PK44 are present in a velocity spectrum VS4.

The peaks PK11, PK21, PK31, and PK41 are respectively present at an identical velocity bin in the velocity spectra VS1, VS2, VS3, and VS4. Similarly, the peaks PK12, PK22, PK32, and PK42 are respectively present at an identical velocity bin in the velocity spectra VS1, VS2, VS3, and VS4. The peaks PK13, PK23, PK33, and PK43 are respectively present at an identical velocity bin in the velocity spectra VS1, VS2, VS3, and VS4. The peaks PK14, PK24, PK34, and PK44 are respectively present at an identical velocity bin in the velocity spectra VS1, VS2, VS3, and VS4.

Thus, for example, when the peak of the selected target in the reception spectrum RS1 corresponds to the peaks PK11, PK12, and PK13, the processing unit 6 first determines whether there is power variation among the peaks PK11, PK21, PK31, and PK41. Specifically, the processing unit 6 calculates the maximum power difference PD1 (hereinafter referred to as the maximum power difference PD1) among the peaks PK11, PK21, PK31, and PK41, and when the maximum power difference is equal to or greater than a preset variation threshold, the processing unit 6 determines that there is power variation among the peaks PK11, PK21, PK31, and PK41. Similarly, the processing unit 6 determines whether there is power variation among the peaks PK12, PK22, PK32, and PK42 and among the peaks PK13, PK23, PK33, and PK43.

Figure 14:
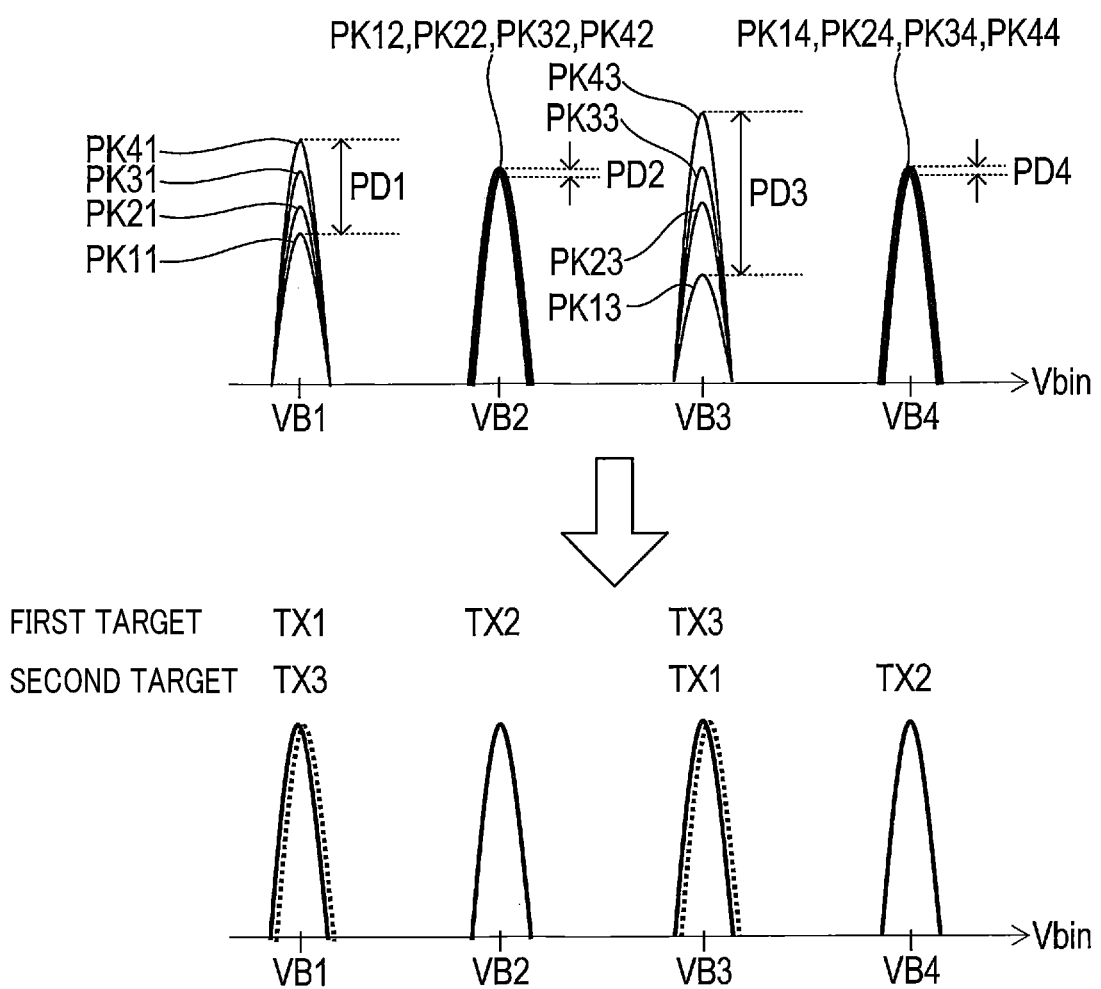
FIG. 14 is a diagram illustrating a method for determining whether there is power variation.

As illustrated in FIG. 14, for example, the maximum power difference PD1 among the peaks PK11, PK21, PK31, and PK41 at a velocity bin VB1 is assumed to be equal to or greater than the variation threshold, and the maximum power difference PD2 among the peaks PK12, PK22, PK32, and PK42 at a velocity bin VB2 is assumed to be smaller than the variation threshold. Similarly, for example, the maximum power difference PD3 among the peaks PK13, PK23, PK33, and PK43 at a velocity bin VB3 is assumed to be equal to or greater than the variation threshold, and the maximum power difference PD4 among the peaks PK14, PK24, PK34, and PK44 at a velocity bin VB4 is assumed to be smaller than the variation threshold.

In this case, the processing unit 6 determines that there is power variation among the peaks PK11, PK21, PK31, and PK41, there is no power variation among the peaks PK12, PK22, PK32, and PK42, there is power variation among the peaks PK13, PK23, PK33, and PK43, and there is no power variation among the peaks PK14, PK24, PK34, and PK44.

Whether there is power generation is determined as described above because as illustrated in FIG. 14, the peaks of a first target and a second target are present in each of the velocity bins VB1 and VB3. Note that the peaks of the velocity bins VB1, VB2, and VB3 at the first target are respectively due to transmission signals from the transmitting antennas TX1, TX2, and TX3. The peaks of the velocity bins VB3, VB4, and VB1 at the second target are respectively due to transmission signals from the transmitting antennas TX1, TX2, and TX3.

When the processing of S500 ends, at S510, the processing unit 6 uses a virtual reception signal from a virtual receiving antenna formed by the transmitting antenna corresponding to the peak determined to involve no power variation to execute orientation detection processing such as MUSIC or beamforming, thereby calculating the orientation θ of the object, as illustrated in FIG. 12.

For example, in the first target illustrated in FIG. 14, the transmitting antenna TX2 corresponds to the peak determined to involve no power variation. Thus, as illustrated in FIG. 15, among virtual receiving antennas VR1, VR2, VR3, and VR4 formed by the transmitting antenna TX1, virtual receiving antennas VR5, VR6, VR7, and VR8 formed by the transmitting antenna TX2 and virtual receiving antennas VR9, VR10, VR11, and VR12 formed by the transmitting antenna TX3, the orientation θ of the first target is calculated using virtual reception signals from the virtual receiving antennas VR5, VR6, VR7, and VR8 formed by the transmitting antenna TX2.

In the second target illustrated in FIG. 14, the transmitting antenna TX2 corresponds to the peak determined to involve no power variation. Thus, as illustrated in FIG. 15, the orientation θ of the second target is calculated using virtual reception signals from the virtual receiving antennas VR5, VR6, VR7, and VR8 formed by the transmitting antenna TX2.

Figure 16:
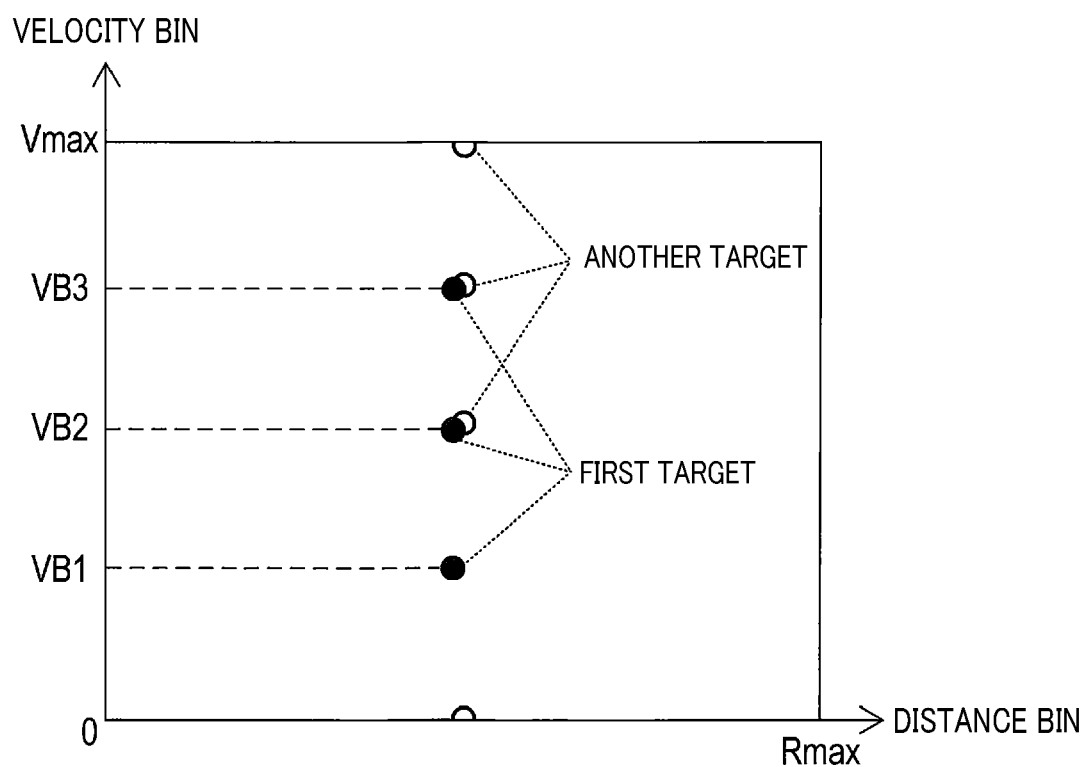
FIG. 16 is a diagram illustrating a reception spectrum for a multi-target mixed environment.

For example, as illustrated in FIG. 16, when the peak of the first target is present in the velocity bins VB1, VB2, and VB3, the peak of another target may be present in the velocity bins VB2 and VB3. In this case, the peak of the velocity bin VB1 is determined to involve no power variation.

When the processing of S510 ends, at S520, the processing unit 6 registers, as object information, a set of the target distance r of the selected target, the target velocity v of the selected target, and the orientation θ calculated at S510, as illustrated in FIG. 12.

At S530, the processing unit 6 determines whether all of the registered targets have been selected as selected targets. If the determination is affirmative, the processing unit 6 ends the information generation processing. If the determination is negative, the processing unit 6 proceeds to S490.

The radar apparatus 1 configured as described above includes the transmitting antenna unit 3, the oscillating unit 21, the modulating unit 22, the receiving antenna unit 4, and the processing unit 6.

The transmitting antenna unit 3 includes M transmitting antennas. The oscillating unit 21 generates a common signal of continuous waves. The modulating unit 22 performs phase shift keying on M branch signals into which the common signal is branched and which are identical in number to the M transmitting antennas, the branch signals having phases rotated at every preset cycle period Tp with different phase rotation amounts to generate M transmission signals that are input to the M transmitting antennas.

The receiving antenna unit 4 includes N receiving antennas. The processing unit 6 generates information related to an object having reflected radiation waves from the transmitting antenna unit 3, based on a plurality of signal components corresponding to M transmission signals extracted from each of N reception signals received at the receiving antenna unit 4.

The M transmitting antennas and the N receiving antennas are used to form a virtual array including a plurality of virtual receiving antennas.

The processing unit 6 analyzes a reception signal to calculate, for every N receiving antennas, a velocity spectrum in which a frequency is associated with the velocity at which the phase of the reception signal is changed at every cycle period Tp.

The processing unit 6 extracts, as a group of identical object peaks, peaks that are generated on the velocity spectrum due to an identical object and that are identical in number to the transmitting antennas, and determines the relative velocity of the object from the positional relationship, on the velocity spectrum, among a plurality of peaks belonging to the group of identical object peaks.

The processing unit 6 determines, for each of the plurality of peaks constituting the group of identical object peaks, whether there is power variation among the N receiving antennas.

The processing unit 6 calculates the orientation of the object except for virtual receiving antennas included in the plurality of virtual receiving antennas and formed by transmitting antennas corresponding to the peaks determined to involve power variation.

As described above, when the first target and the second target are present around the radar apparatus 1, and some of a plurality of peaks constituting a group of identical object peaks for the first target overlap some of a plurality of peaks constituting a group of identical object peaks for the second target, the radar apparatus 1 calculates the orientations of the first and second targets except for virtual receiving antennas formed by transmitting antennas corresponding to the overlapping peaks. Thus, when the first target and the second target are present around the radar apparatus 1, the radar apparatus 1 can reduce the adverse effects of the second object when calculating the orientation of the first target. Thus, the radar apparatus 1 can improve the detection accuracy of the orientation of the object.

The processing unit 6 determines whether the number of the peaks present on the velocity spectrum is greater than the number of the transmitting antennas of the transmitting antenna unit 3, and upon determining that the number of the peaks is not greater than the number of the transmitting antennas, bars determination of whether there is power variation. This restrains the radar apparatus 1 from determining whether there is power variation even when whether there is power variation need not be determined. Consequently, power consumption of the radar apparatus 1 can be reduced.

In the embodiment described above, S80 corresponds to processing executed by a spectrum calculating unit, S240 to S300 and S410 to S460 correspond to processing executed by a velocity determining unit, S500 corresponds to processing executed by a power variation determining unit, S510 corresponds to processing executed by an orientation calculating unit, and S230 corresponds to processing executed by a barring unit.

An embodiment of the present disclosure has been described. However, the present disclosure is not limited to the above-described embodiment, and can be varied for implementation.

The processing unit 6 described in the present disclosure and techniques of the processing unit 6 may be implemented by a dedicated computer provided by configuring a processor and a memory programmed to execute one or more functions embodied by a computer program. Alternatively, the processing unit 6 described in the present disclosure and techniques of the processing unit 6 may be implemented by a dedicated computer provided by configuring a processor using one or more dedicated hardware logic circuits. Alternatively, the processing unit 6 described in the present disclosure and techniques of the processing unit 6 may be implemented by one or more dedicated computers configured using a combination of a processor and a memory programmed to execute one or more functions and a processor configured using one or more hardware logic circuits. The computer programs may be stored in a computer readable non-transitory tangible recording medium as instructions executed by the computer. The techniques for implementing the functions of the units included in the processing unit 6 need not necessarily include software, and all of the functions may be implemented using one or more pieces of hardware.

A plurality of functions of one component in the above-described embodiment may be implemented by a plurality of components, or one function of one component may be implemented by a plurality of components. A plurality of functions of a plurality of components may be implemented by one component, or one function implemented by a plurality of components may be implemented by one component. Part of the configuration of the above-described embodiment may be omitted. At least part of the configuration of the above-described embodiment may be added to or substituted with the configuration of another embodiment.

Besides the radar apparatus 1 described above, the present disclosure can be implemented in a variety of forms such as a system including the radar apparatus 1 as a component, a program causing a computer to function as the radar apparatus 1, a non-transient tangible recording medium such as a semiconductor memory in which the program is recorded, and an object detecting method.

An aspect of the present disclosure is a radar apparatus including a transmitting antenna unit (3), an oscillating unit (21), a modulating unit (22), a receiving antenna unit, and a processing unit (6).

The transmitting antenna unit (3) includes a plurality of transmitting antennas. The oscillating unit (21) is configured to generate a common signal of a continuous wave. The modulating unit (22) is configured to perform phase shift keying on a plurality of branch signals into which the common signal is branched and which are identical in number to the plurality of transmitting antennas, the branch signals having phases rotated at every preset cycle period with different phase rotation amounts to generate a plurality of transmission signals that are input to the plurality of transmitting antennas.

The receiving antenna unit (4) includes a plurality of receiving antennas. The processing unit (6) is configured to generate information related to an object having reflected a radiation wave from the transmitting antenna unit, based on a plurality of signal components corresponding to a plurality of transmission signals extracted from each of a plurality of reception signals received at the receiving antenna unit.

The plurality of transmitting antennas and the plurality of receiving antennas are used to form a virtual array including a plurality of virtual receiving antennas.

The processing unit includes a spectrum calculating unit, a velocity determining unit, a power variation determining unit, and an orientation calculating unit.

The spectrum calculating unit (S80) is configured to analyze the reception signal to calculate, for every plurality of the receiving antennas, a velocity spectrum in which a frequency is associated with a velocity at which the phase of the reception signal is changed at every cycle period.

The velocity determining unit (S240 to S300, S410 to S460) is configured to extract, as a group of identical object peaks, peaks that are generated on the velocity spectrum due to the identical object and that are identical in number to the transmitting antennas, and configured to determine a relative velocity of the object from a positional relationship, on the velocity spectrum, among a plurality of peaks belonging to the group of identical object peaks.

The power variation determining unit (500) is configured to determine, for each of the plurality of peaks constituting the group of identical object peaks, whether there is power variation among a plurality of the receiving antenna.

The orientation calculating unit (S510) is configured to calculate an orientation of the object except for virtual receiving antennas included in a plurality of the virtual receiving antennas and formed by the transmitting antennas corresponding to the peaks determined by the power variation determining unit to involve the power variation.

When a first object and a second object are present around the radar apparatus, and some of a plurality of peaks constituting a group of identical object peaks for the first object overlap some of a plurality of peaks constituting a group of identical object peaks for the second object, the radar apparatus of the present disclosure configured as described above calculates the orientations of the first and second objects except for virtual receiving antennas formed by transmitting antennas corresponding to the overlapping peaks. Thus, when the first object and the second object are present around the radar apparatus of the present disclosure, the radar apparatus can reduce the adverse effects of the second object when calculating the orientation of the first object. Thus, the radar apparatus of the present disclosure can improve the detection accuracy of the orientation of the object.

What is claimed is:

1. A radar apparatus comprising:
   a transmitting antenna unit including a plurality of transmitting antennas;

an oscillating unit configured to generate a common signal of a continuous wave;

a modulating unit configured to perform phase shift keying on a plurality of branch signals into which the common signal is branched and which are identical in number to the plurality of transmitting antennas, the branch signals having phases rotated at every preset cycle period with different phase rotation amounts to generate a plurality of transmission signals that are input to the plurality of transmitting antennas;

a receiving antenna unit including a plurality of receiving antennas, wherein the plurality of transmitting antennas and the plurality of receiving antennas are used to form a virtual array including a plurality of virtual receiving antennas, and wherein the radar apparatus further comprises a processor and a memory storing a program, the processor executing the program to:

generate information related to an object having reflected a radiation wave from the transmitting antenna unit, based on a plurality of signal components corresponding to a plurality of transmission signals extracted from each of a plurality of reception signals received at the receiving antenna unit;

analyze the reception signal to calculate, for every plurality of the receiving antennas, a velocity spectrum in which a frequency is associated with a velocity at which the phase of the reception signal is changed at every cycle period;

extract, as a group of identical object peaks, peaks that are generated on the velocity spectrum due to the identical object and that are identical in number to the transmitting antennas, and determine a relative velocity of the object from a positional relationship, on the velocity spectrum, among a plurality of peaks belonging to the group of identical object peaks;

determine, for each of the plurality of peaks constituting the group of identical object peaks, whether there is power variation among a plurality of the receiving antennas;

calculate an orientation of the object except for virtual receiving antennas included in a plurality of the virtual receiving antennas and formed by the transmitting antennas corresponding to the peaks determined to involve the power variation;

determine whether the number of the peaks present on the velocity spectrum is greater than the number of the transmitting antennas of the transmitting antenna unit; and bar the power variation determination whether there is the power variation among the plurality of the receiving antennas, upon determining that the number of the peaks is not greater than the number of the transmitting antennas.

* * * * *